UNITED STATES PATENT OFFICE.

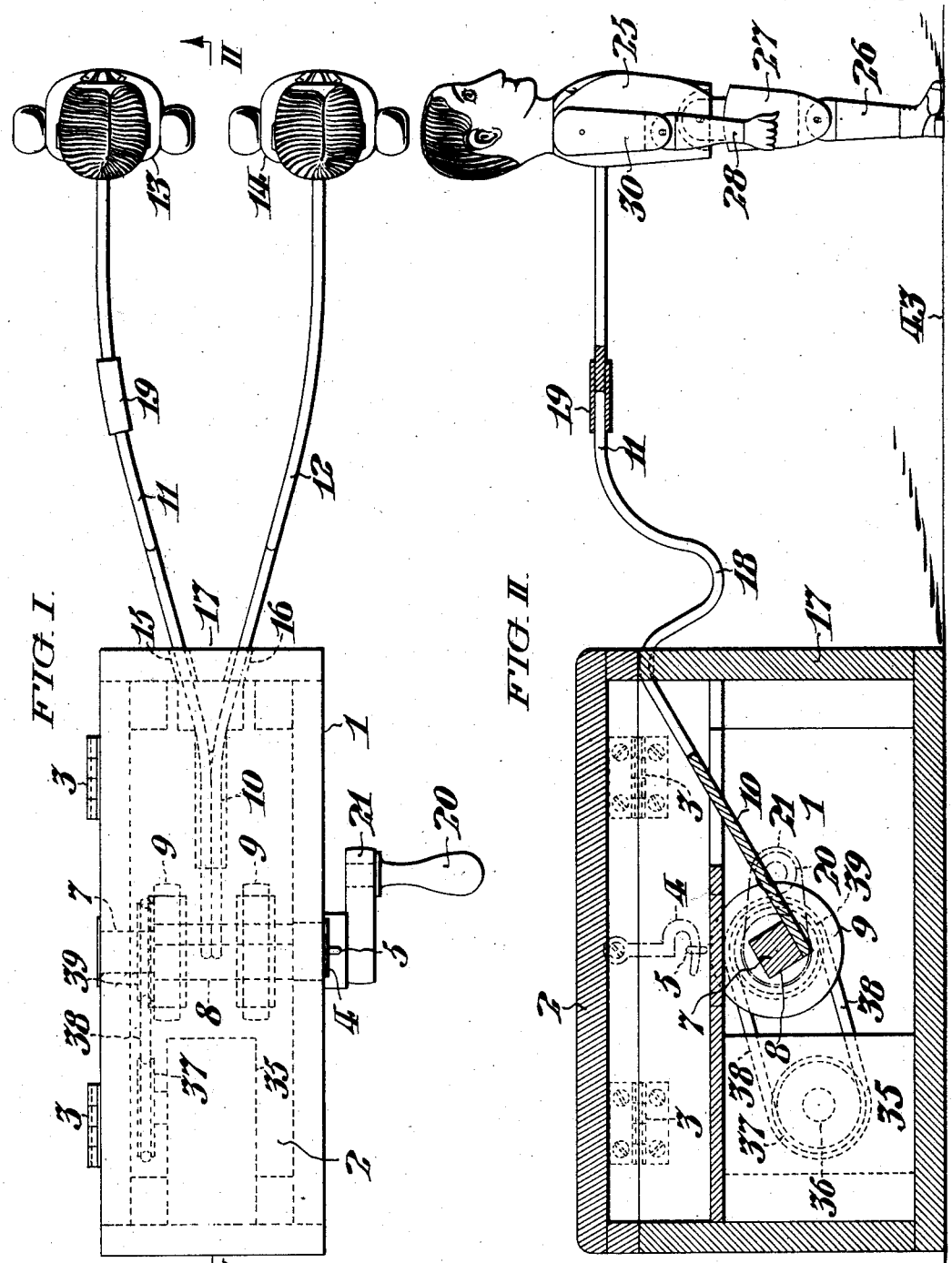
A. A. JONES.
DANCING TOY.
APPLICATION FILED MAY 17, 1907.
905,707.
Patented Dec. 1, 1908.
2 SHEETS—SHEET 1.
WITNESSES:
INVENTOR:
ALBERT A. JONES, A. A. JONES.
DANCING TOY.
APPLICATION FILED MAY 17, 1907.
905,707.
Patented Dec. 1, 1908.
2 SHEETS—SHEET 2.
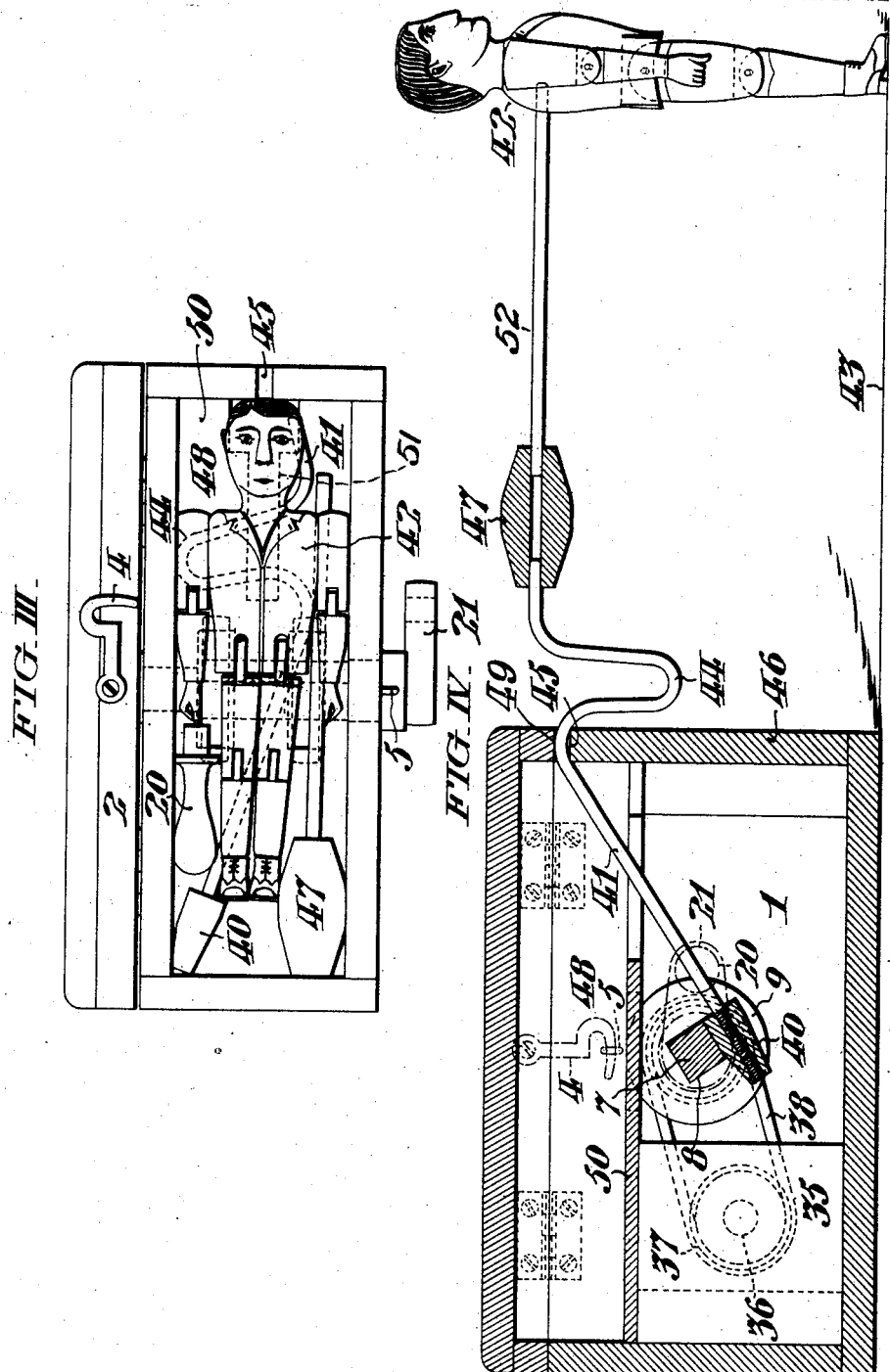
WITNESSES:
INVENTOR:
ALBERT A. JONES,

ALBERT A. JONES, OF PHILADELPHIA, PENNSYLVANIA, ASSIGNOR OF ONE-HALF TO GEORGE W. M. FISHER, OF PHILADELPHIA, PENNSYLVANIA.

DANCING TOY.

No. 905,707.

Specification of Letters Patent.

Patented Dec. 1, 1908.

Application filed May 17, 1907. Serial No. 374,303.

*To all whom it may concern:*

Be it known that I, ALBERT A. JONES, a citizen of the United States, residing at Philadelphia, in the county of Philadelphia and State of Pennsylvania, have invented a certain new and useful Improvement in Dancing Toys, whereof the following is a specification, reference being had to the accompanying drawings.

My invention relates to dancing toys comprising jointed figures which are supported by spring levers arranged to be vibrated to cause said figures to assume dancing positions.

It is the object of my invention to provide a dancing toy whose operative mechanism is inclosed in a casing, with means whereby the dancing figure is detachably supported by a sectional spring lever, which is directly engaged by the shaft of said mechanism and thereby vibrated to cause said figure to dance, upon any solid surface upon which said casing is supported but which is distinct from said casing, when operatively assembled; and to provide a chamber in said casing for the reception of said dancing figure and its supporting lever when not in use.

My invention comprises a casing, inclosing a music-box, a shaft journaled in said casing, a sectional spring lever, pivoted centrally in said casing in direct contact with said shaft, a jointed dancing figure detachably supported by said lever, a resilient block on said lever arranged to augment its vibration, a coupling piece arranged to join the sections of said lever, means arranged to operate said dancing figure and music-box contemporaneously, and a partition in said casing forming a chamber for the reception of said figure and lever when separated.

My invention also comprises the various novel features of construction and arrangement hereinafter more definitely specified.

In the accompanying drawings, Figure I, is a plan view of a convenient form of my invention. Fig. II, is a central vertical sectional view taken on the line II II, in Fig. I. Fig. III, is a plan view of the casing with its lid open, and embodying a modified form of my invention, wherein the dancing figure, the supporting lever, and operating handle may be included in said casing. Fig. IV, is a central vertical sectional view of the modified form of my invention operatively assembled.

In said figures the casing 1, comprises a lid 2, having hinges 3, 3, and a hook 4, arranged to engage the eye 5, to secure said lid in closed position. The casing 1, comprises bearings for the shaft 7, which has a central squared region 8, between opposed flanges 9.

A bifurcated spring lever 10, is loosely engaged at its inner end with said squared region 8, and is provided with the opposed prongs 11 and 12, whose outer ends detachably support the dancing figures 13 and 14; and is pivotally supported intermediate of its length in the grooves 15 and 16, in the front wall 17, of the casing 1. Said prongs each comprise a bight 18, arranged to increase their resiliency, and a curved pivotal region adjacent to said bight whereby they are retained in definite position with respect to said supporting wall 17. Said prongs may be integral throughout their length as indicated by the prong 12; or as indicated, with respect to the prong 11, may comprise separable sections, one of which has the socket 19, arranged to receive the free end of the other section, and thus enable the levers to be varied in length, to support the dancing figure 13, at variable distances from the fulcrum of said lever. For instance, said figure may be supported on the outer end of the prong 11, proper, or it may be supported by the extension comprising the socket 19, to facilitate its augmented vibration. It is to be noted that extensions of different lengths for instance as shown respectively in Figs. II, and IV, may be employed to further vary the distance of said dancing figures from said fulcrum and thereby vary their vibratory effect.

The rotation of the shaft 7, is effected by the handle 20, on the crank 21, and by reason of the differences between the major and minor diameters of the squared portion of said shaft, a vibratory motion of the bifurcated spring lever 10, is produced, which causes the dancing figures 13, and 14 to vibrate up and down. Said figures 13, and 14, comprise the body 25, the lower limb 26, pivotally connected to said body, by the upper limb 27; and the lower arm 28, pivotally connected to the body 25, by the upper arm 30. By the vibration aforesaid of the dancing figures 13 and 14, the jointed limb members are caused to swing into various positions and thereby assume various dancing postures.

The casing 1, also incloses a music-box 35, whose shaft 36, comprises the pulley 37, connected by the belt 38, to the pulley 39, on the shaft 7, whereby said music-box is operated contemporaneously with the vibration of the dancing figures 13 and 14.

In the form of my invention shown in Figs. III and IV, the squared region 8, of the shaft 7, is arranged to loosely engage the resilient block 40, on the inner end of the spring lever 41. The outer end of said lever detachably supports the dancing figure 42, in such relation to the casing that its feet will strike upon any suitable plane surface 43, upon which said casing 1, is supported. The spring lever 41, comprises the bight 44, forming a curved pivotal region 49, which is maintained in the notch 45, in definite relation to the wall 46, which supports said lever, and is conveniently retained in said notch by the lid 2, as best shown in Fig. IV. Said lever 41, is conveniently formed of two sections joined by the coupling piece 47, so that they may be separated and conveniently packed away with the dancing figure 42, and the handle 20, in the chamber 48, which is formed by the removable horizontal diaphragm 50, above the mechanism in the casing 1, as shown in Fig. III.

As best shown in Fig. III, said diaphragm 50, is provided with the slot 51, in registry with the notch 45, and embraces the lever 41, when in operative position as shown in Fig. IV, and thereby limits the lateral movement of the dancing figure 42.

I do not desire to limit myself to the precise details of construction and arrangement herein shown and described, as it is obvious that various modifications may be made therein without departing from the essential features of my invention as defined in the appended claims.

I claim:—

1. In a dancing toy, the combination with a spring lever, of a resilient block on one end of said lever; a dancing figure on the other end of said lever; means pivotally supporting said lever intermediate of its ends; and, means arranged to engage said resilient block, to vibrate said spring lever, substantially as set forth.

2. In a dancing toy, the combination with a spring lever comprising a bight intermediate of its ends; of means pivotally supporting said lever adjacent to said bight; a dancing figure removably supported by said lever; a resilient block carried by said lever; and, means arranged to engage said resilient block, to vibrate said lever, substantially as set forth.

3. In a dancing toy, the combination with a casing comprising a notch in its upper edge; of a spring lever pivotally supported in said notch; a resilient block on one end of said lever; a dancing figure on the other end of said lever; means within said casing arranged to engage said resilient block to vibrate said spring lever; and a lid for said casing arranged to cover said notch and retain said spring lever therein when vibrated, substantially as set forth.

4. In a dancing toy, the combination with a casing comprising a notch in its upper edge; of a spring lever pivotally supported in said notch; a block on one end of said lever; a dancing figure on the other end of said lever; means within said casing arranged to engage said block to vibrate said spring lever; and, a hinged lid for said casing arranged to retain said lever in said notch when vibrated, substantially as set forth.

5. In a dancing toy, the combination with a casing comprising a notch in its upper edge; of a spring lever pivotally supported in said notch; a dancing figure carried at one end of said lever; means arranged to engage its other end and vibrate said lever; and, a diaphragm in said casing comprising a slot in registry with said notch, arranged to limit the lateral movement of said figure, substantially as set forth.

6. In a dancing toy, the combination with a casing comprising a wall 46, having a notch 45; of a spring lever 41, comprising a bight 44, arranged to increase its resiliency, and a curved pivotal region 49, in proximity to said bight, arranged to determine its relation to said notch 45; a dancing figure 42, carried by said lever; an extension 52, arranged to vary the distance between the dancing figure 42; and said pivotal region 49; a coupling 47, arranged to secure said lever 41, and extension 52, together; a rotatable shaft 7, comprising a square region 8, arranged to engage said lever 41, to effect the vibration of said dancing figure; and, a lid 2, arranged to retain said lever 41, with its pivotal region 49, in the notch 45, when vibrated, substantially as set forth.

7. In a dancing toy, the combination with a casing having a vertical wall provided with a notch; of a polygonal shaft journaled in said casing; a spring lever pivoted in said notch and supported thereby in operative relation with said shaft; a dancing figure carried by said lever; and a lid for said casing, arranged to maintain said spring lever in said notch, substantially as set forth.

8. In a dancing toy, the combination with a casing having a vertical wall provided with a notch; of a polygonal shaft journaled in said casing, and extending therethrough; a handle on said shaft exterior to said casing; a spring lever pivoted in said notch and supported thereby in operative engagement with said polygonal shaft, and in removable relation with said shaft and said notch; a dancing figure removably supported by said spring lever; a lid hinged to and arranged to close said casing, and maintain said spring lever in said notch; and means connecting said lid with said casing at its free edge to prevent its accidental displacement, substantially as set forth.

In testimony whereof, I have hereunto signed my name, at Philadelphia, in the State of Pennsylvania, this sixteenth day of May, 1907.

ALBERT A. JONES.

Witnesses:
 GEO. W. M. FISHER,
 WM. F. KOHN.